US012266332B2

(12) United States Patent
Iriyama

(10) Patent No.: US 12,266,332 B2
(45) Date of Patent: Apr. 1, 2025

(54) REPRODUCTION CONTROL METHOD, REPRODUCTION CONTROL SYSTEM, AND PROGRAM

(71) Applicant: Yamaha Corporation, Shizuoka (JP)

(72) Inventor: Tatsuya Iriyama, Shizuoka (JP)

(73) Assignee: Yamaha Corporation, Shizuoka (JP)

( * ) Notice: Subject to any disclaimer, the term of this patent is extended or adjusted under 35 U.S.C. 154(b) by 282 days.

(21) Appl. No.: 17/950,657

(22) Filed: Sep. 22, 2022

(65) Prior Publication Data

US 2023/0013425 A1 Jan. 19, 2023

Related U.S. Application Data

(63) Continuation of application No. PCT/JP2020/045786, filed on Dec. 9, 2020.

(30) Foreign Application Priority Data

Mar. 23, 2020 (JP) ................................. 2020-050816

(51) Int. Cl.
*G10H 7/00* (2006.01)
*G10H 1/00* (2006.01)

(52) U.S. Cl.
CPC ........... *G10H 7/002* (2013.01); *G10H 1/0041* (2013.01)

(58) Field of Classification Search
CPC ............................. G10H 7/002; G10H 1/0041
See application file for complete search history.

(56) References Cited

U.S. PATENT DOCUMENTS

| | | | | |
|---|---|---|---|---|
| 8,913,760 B2 * | 12/2014 | Tagaeto | H03G 5/025 381/104 |
| 2023/0012622 A1 * | 1/2023 | Iriyama | G10H 1/366 |
| 2023/0013425 A1 * | 1/2023 | Iriyama | G10H 3/146 |
| 2023/0019428 A1 * | 1/2023 | Iriyama | G06F 1/1684 |
| 2023/0042477 A1 * | 2/2023 | Iriyama | G10L 13/10 |
| 2024/0013756 A1 * | 1/2024 | Maezawa | G10H 1/34 |

FOREIGN PATENT DOCUMENTS

| | | | |
|---|---|---|---|
| JP | 2007322683 A * | 12/2007 | G10H 1/0008 |
| JP | 2022149160 A * | 10/2022 | G10H 1/0008 |

OTHER PUBLICATIONS

International Search Report in PCT/JP2020/045786, dated Feb. 9, 2021.
Yamaha Corporation, DTC-MULTI12, [online], Searched Jan. 8, 2020, https://jp.yamaha.com/products/musical_instruments/drums/el_drums/drum_kits/dtx_multi_pad/features.html#product-tabs.
Notice of Reasons for Refusal in the corresponding Japanese Patent Application No. 2020-050816, dated Jan. 30, 2024.

* cited by examiner

*Primary Examiner* — Robert W Horn
(74) *Attorney, Agent, or Firm* — Global IP Counselors, LLP

(57) ABSTRACT

A reproduction control method, which is executed by a computer, includes determining, based on an image showing an object, whether a type of the object is a first type or a second type that is different from the first type, and reproducing a sound, triggered by a striking of an operation surface by the object, based on a result of the determining.

15 Claims, 7 Drawing Sheets

REPRODUCTION CONTROL METHOD, REPRODUCTION CONTROL SYSTEM, AND PROGRAM

CROSS-REFERENCE TO RELATED APPLICATIONS

This application is a continuation application of International Application No. PCT/JP2020/045786, filed Dec. 9, 2020, which claims priority to Japanese Patent Application No. 2020-050816 filed in Japan on Mar. 23, 2020. The entire disclosures of International Application No. PCT/JP2020//045786 and Japanese Patent Application No. 2020-050816 are hereby incorporated herein by reference.

BACKGROUND

Technological Field

The present disclosure relates to a technology for controlling sound.

Background Information

Various technologies for generating sound in response to user operations have been proposed in the prior art. For example, Yamaha Corporation, DTC-MULTII2, [online], [Searched Jan. 8, 2020] <URL: https://jp.yamaha.com/products/musical_instruments/drums/el_drums/drum_kits/dtx-_multi_pad/features.html#product-tabs> discloses an electronic drum in which the user can select an operating mode in which the user strikes an operation surface with a percussion instrument stick or an operating mode in which the user strikes the operation surface with his/her hand.

SUMMARY

However, in the conventional configuration, it is necessary that the user choose in advance between striking the operation surface with either a percussion instrument stick or his or her hand. In consideration of this circumstance, the object of one aspect of the present disclosure is to reduce the user's burden of operation in situations in which sound is reproduced by striking the operation surface with a plurality of object types.

A reproduction control method executed by a computer according to one aspect of the present disclosure comprises determining, based on an image showing an object, whether a type of the object is a first type or a second type that is different from the first type, and reproducing a sound, triggered by a striking of an operation surface by the object, based on a result of the determining.

A reproduction control system according to one aspect of the present disclosure comprises an electronic controller including at least one processor. The electronic controller is configured to execute a plurality of modules including an object determination module configured to determines, based on an image showing an object, whether a type of the object is a first type or a second type that is different from the first type, and a reproduction control module that reproduces a sound, triggered by a striking of an operation surface by the object, based on a result of determination of the object determination module.

A non-transitory computer readable medium storing a program according to one aspect of the present disclosure causes a computer to execute a process, and the process comprises determining, based on an image showing an object, whether a type of the object is a first type or a second type that is different from the first type, and reproducing a sound, triggered by a striking of an operation surface by the object, based on a result of the determining.

DETAILED DESCRIPTION OF THE EMBODIMENTS

Selected embodiments will now be explained in detail below, with reference to the drawings as appropriate. It will be apparent to those skilled from this disclosure that the following descriptions of the embodiments are provided for illustration only and not for the purpose of limiting the invention as defined by the appended claims and their equivalents.

A: First Embodiment

Figure 1:
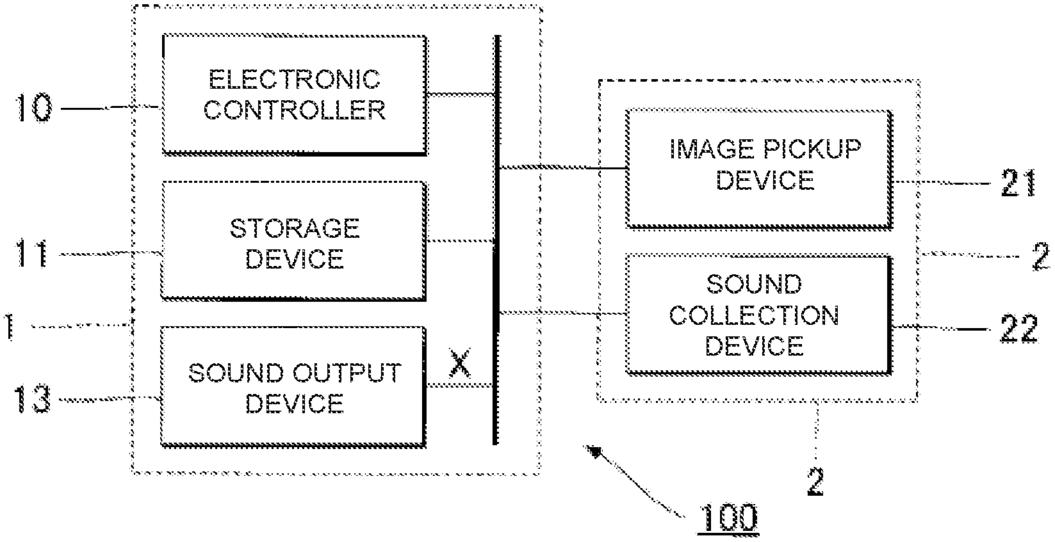
FIG. 1 is a block diagram illustrating the configuration of a reproduction control system.

FIG. 1 is a block diagram illustrating the configuration of a reproduction control system 100 according to a first embodiment of the present disclosure. The reproduction control system 100 is a computer system that reproduces a sound (hereinafter referred to as "target sound") in response to a user operation. The reproduction control system 100 has a control system 1 and a detection unit (detector) 2. The detection unit 2 detects the user operation. The control system 1 reproduces the target sound in accordance with the operation detected by the detection unit 2. The target sound reproduced by the control system 1 is a performance sound of a musical instrument, such as a percussion and a keyboard instrument. However, the sound of singing or speech can be reproduced as the target sound.

The control system 1 includes an electronic controller (control device) 10, a storage device 11, and a sound output device 13. For example, the control system 1 is realized by an information terminal such as a smartphone, a tablet terminal, or a personal computer. The control system 1 can be realized by a single device or a plurality of separate devices.

The electronic controller 10 is one or a plurality of processors that control each element of the control system 1. Specifically, the electronic controller 10 can be configured to comprise one or more types of processors, such as a CPU (Central Processing Unit), an SPU (Sound Processing Unit), a DSP (Digital Signal Processor), an FPGA (Field Programmable Gate Array), an ASIC (Application Specific Integrated Circuit), etc. The electronic controller 10 generates an audio signal X representing the waveform of the target sound in accordance with the user operation. The term "electronic controller" as used herein refers to hardware that executes software programs.

The sound output device 13 reproduces the target sound represented by the audio signal X generated by the electronic controller 10. The sound output device 13 is a loudspeaker or headphones, for example. The D/A converter that converts audio signal X from digital to analog and the amplifier that amplifies audio signal X have been omitted from the figure for the sake of convenience. Further, the example shown in FIG. 1 shows a configuration in which the sound output device 13 is provided in the control system 1. In another example, a sound output device 13 that is separate from the control system 1 can be connected to the control system 1 wirelessly or by wire.

The storage device 11 includes one or more memory units (computer memories) for storing a program to be executed by the electronic controller 10 and various data used by the electronic controller 10. The storage device 11 is a known storage medium, such as a magnetic storage medium or a semiconductor storage medium, or a combination of a plurality of various types of storage media. The storage device 11 can be separated from the reproduction control system 100 (for example, cloud storage), and the electronic controller 10 can read from or write to the storage device 11 via a communication network, such as a mobile communication network or the Internet. That is, the storage device 11 can be omitted from the reproduction control system 100.

Figure 2:
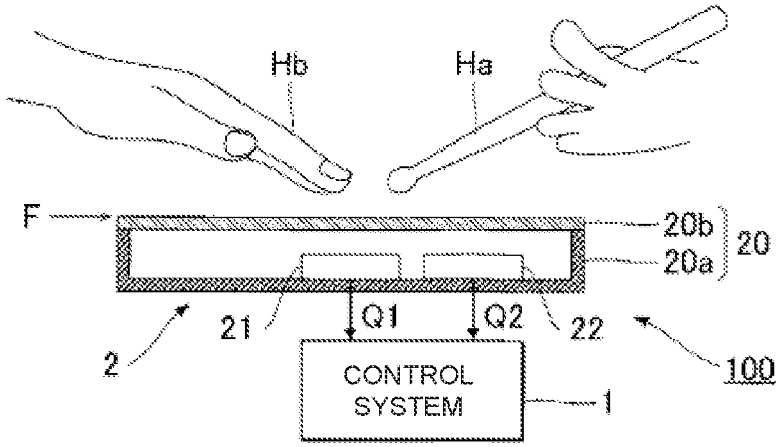
FIG. 2 is a schematic diagram illustrating the configuration of a detection unit.

FIG. 2 is a schematic diagram illustrating the configuration of any one detection unit 2. The detection unit 2 includes a housing 20, an image pickup device 21, and a sound collection device 22. The housing 20 of FIG. 2 is a hollow structure that houses the image pickup device 21 and the sound collection device 22. Specifically, the housing 20 has an enclosure portion **20*a* and a light transmission portion 20*b*. The enclosure portion 20*a* is a box-shaped structure that has an internal space with an opening at the top. The light transmission portion 20*b* is a plate-shaped member that closes the opening of the enclosure portion 20*a*. The light transmission portion 20*b* transmits light in the wavelength range that can be detected by the image pickup device 21. The light transmission portion 20*b* has an operation surface (striking surface) F, which is the surface opposite to the surface that opposes the enclosure portion 20*a***. The operation surface F is the surface to be struck by the user.

The user can selectively perform the operation of striking operation surface F using a stick Ha or directly striking operation surface F with his or her hand Hb. The stick Ha is a rod-shaped member used for playing a percussion instrument. In the following description, any object used to strike operation surface F is collectively referred to as "striking body H." the stick Ha and hand Hb are examples of the striking body H. The stick Ha is one example of a "first type" of the striking body H, and the hand Hb is one example of a "second type" of the striking body H.

The image pickup device 21 is an optical sensor that captures an image of the striking body H. The image pickup device 21 is installed in the vicinity of the midpoint (center) of the bottom surface of the enclosure portion **20*a* and captures an image (moving image) of the striking body H through the operation surface F. Specifically, the image pickup device 21 generates an image signal Q1 representing an image of the striking body H (that is, a moving image of the striking body H) arranged in a time sequence. The image signal Q1 is transmitted to the control system 1 via wired or wireless communication. The light detected by the image pickup device 21 is not limited to visible light. For example, invisible light, such as infrared light, can be detected by the image pickup device 21**.

The sound collection device 22 collects ambient sounds to generate a sound collection signal Q2. The sound collection device 22 collects the striking sounds generated when the striking body H strikes operation surface F. That is, the sound collection device 22 generates the sound collection signal Q2 representing the striking sounds. The sound collection signal Q2 is transmitted to the control system 1 via wired or wireless communication. The sound collection device 22 can be installed outside of the housing 20.

Figure 3:
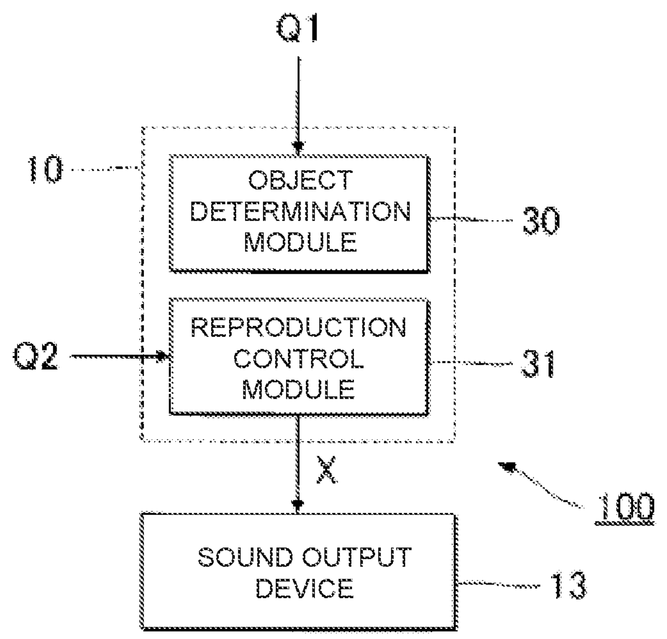
FIG. 3 is a block diagram illustrating the functional configuration of a control system.

FIG. 3 is a block diagram illustrating the functional configuration of the control system 1. The electronic controller 10 of the control system 1 executes programs stored in the storage device 11 to realize a plurality of functions (state detection module (state detection unit) 30 and reproduction control module (reproduction control unit) 31).

The object determination module 30 determines the type of the striking body H from the image of the striking body H captured by the image pickup device 21. That is, the object determination module 30 analyzes an image of the striking body H represented by image signal Q1 to determine the type of the striking body H. Specifically, the object determination module 30 determines whether the striking body H is a stick Ha or a hand Hb.

Any known identification technology can be employed to determine the type of the striking body H. For example, the object determination module 30 can determine the type of the striking body H by using an estimation model that has learned the relationships between images of striking bodies H and types of striking bodies H by machine learning. The estimation model can be any type of deep neural network, such as a recurrent neural network (RNN) or a convolutional neural network (CNN). A combination of a plurality of neural network types can be used as the estimation model. The object determination module 30 can also use a known classifier such as a SVM (Support Vector Machine) to determine the type of the striking body H.

The reproduction control module 31 of FIG. 3 reproduces the target sound of the sound output device 13, triggered by the striking of the operation surface F by the striking body H. Specifically, the reproduction control module 31 generates the audio signal X that represents the target sound. For example, the reproduction control module 31 uses waveform data stored in the storage device 11 to generate audio signal X. The audio signal X is supplied to the sound output device 13, which outputs the target sound.

Even if the striking body H strikes the operation surface F, the reproduction control module 31 does not reproduce the target sound if the strike is weak. More specifically, the reproduction control module 31 reproduces the target sound when an intensity Z (intensity of the striking) (hereinafter referred to as "strike intensity") with which the operation surface F is struck by the striking body H exceeds a threshold Zth. Even if operation surface F is struck by the striking body H, the target sound is not reproduced if the strike intensity Z is below threshold Zth (Zth1, Zth2). By the configuration described above, the probability that the target sound will be reproduced if the user unintentionally contacts the operation surface F can be reduced.

There is a positive correlation between the strike intensity Z with which the operation surface F is struck by the striking body H and the volume of the striking sound. That is, as the strike intensity Z increases, the signal strength (volume, amplitude, or power) of the sound collection signal Q2 generated by the sound collection device 22 increases. Utilizing the correlation described above, the reproduction control module 31 calculates the signal strength of the sound collection signal Q2 generated by the sound collection device 22 as the strike intensity Z of the impact from the striking body H. By the configuration described above, the sound collection device 22 can easily be used to specify the strike intensity Z with which the operation surface F is struck by the striking body H.

The strike intensity Z depends on the type of the striking body H. For example, the stick Ha is harder than the hand Hb. Accordingly, the strike intensity Z tends to be low (that is, the volume of the striking sound tends to be low) when the striking body H is the hand Hb, compared to the case in which the striking body H is the stick Ha. Therefore, in a configuration in which the threshold Zth that is applied as a reproduction condition of the target sound is fixed to a prescribed value that is independent of the type of the striking body H, an imbalance would occur in which the target sound would be more easily reproduced were the user to strike the operation surface F with the stick Ha, as compared with the case in which the user were to strike the operation surface F with hand Hb. From the standpoint of suppressing the imbalance described above, the reproduction control module 31 changes the condition for reproducing the target sound as a function of the type of the striking body H.

Figure 4:
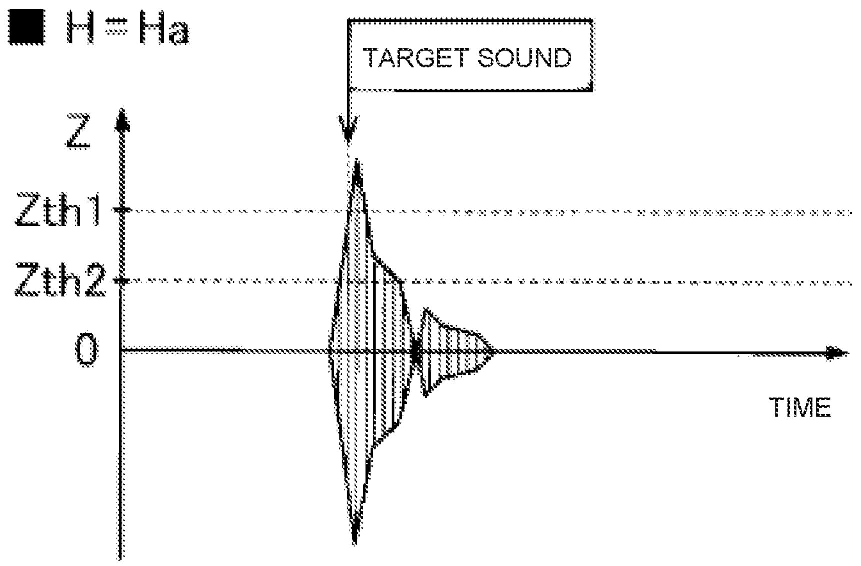
FIG. 4 is an explanatory diagram of the reproduction of a target sound for the case of the striking of an operation surface with the user's hand.
Figure 5:
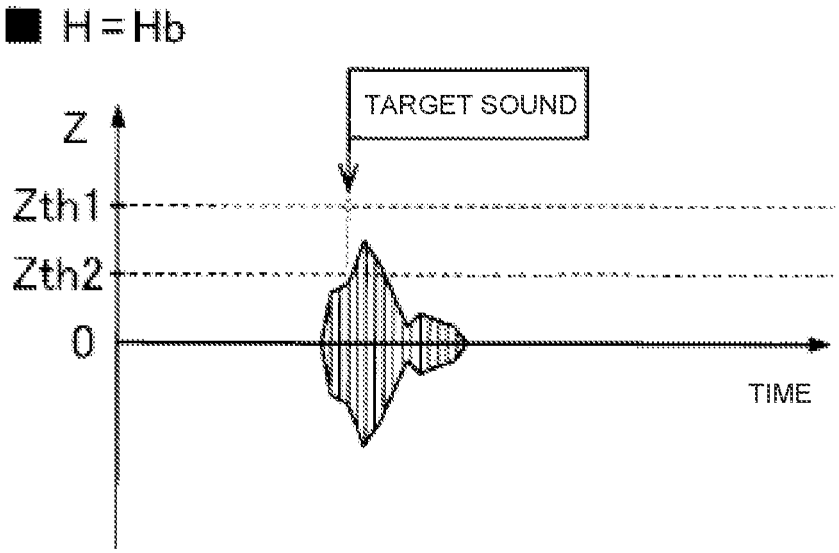
FIG. 5 is an explanatory diagram of the reproduction of a target sound for the case of the striking of an operation surface with a stick.

FIGS. 4 and 5 are explanatory diagrams of the operation of the reproduction control module 31. As illustrated in FIG. 4, if the object determination module 30 determines that the striking body H is the stick Ha, the reproduction control module 31 reproduces the target sound when the strike intensity Z exceeds a first threshold value Zth1. That is, reproduction of the target sound is triggered by a strike that generates a striking sound with an intensity that exceeds the first threshold value Zth1. For example, the target sound is reproduced for a prescribed period of time from the time when the strike intensity Z exceeds the first threshold value Zth1.

On the other hand, as illustrated in FIG. 5, if the object determination module 30 determines that the striking body H is the hand Hb, the reproduction control module 31 reproduces the target sound when the strike intensity Z exceeds a second threshold value Zth2. That is, reproduction of the target sound is triggered by a strike that generates a striking sound with an intensity that exceeds the second threshold value Zth2. For example, the target sound is reproduced for a prescribed period of time from the time when the strike intensity Z exceeds the second threshold value Zth2.

The first threshold value Zth1 and the second threshold value Zth2 are set to different values. Specifically, the second threshold value Zth2 is less than the first threshold value Zth1 (Zth2<Zth1). Accordingly, even if the strike intensity Z by the user's hand Hb does not reach the first threshold value Zth1, if the strike intensity Z exceeds the second threshold value Zth2, the target sound is reproduced. That is, when the user strikes the operation surface F with his or her hand Hb, the target sound can be reproduced at a lower strike intensity Z than when the operation surface F is struck with the stick Ha. In other words, the sensitivity with which an impact from the user's hand Hb is detected is higher than the sensitivity with which an impact from stick Ha is detected. By the configuration described above, it is possible to suppress those situations in which the target sound is hardly reproduced when the user strikes the operation surface F with his or her hand Hb, or in which the target sound is reproduced too frequently when the user strikes operation surface F with the stick Ha.

As described above, when the striking body H is a stick Ha, the target sound is reproduced on the condition (first condition) that the strike intensity Z exceeds the first threshold value Zth1. On the other hand, when the striking body H is a hand Hb, the target sound is reproduced on the condition (second condition) that the strike intensity Z exceeds the second threshold value Zth2. That is, the reproduction conditions for the target sound are different for the stick Ha as the striking body H and for the hand Hb as the striking body H.

Figure 6:
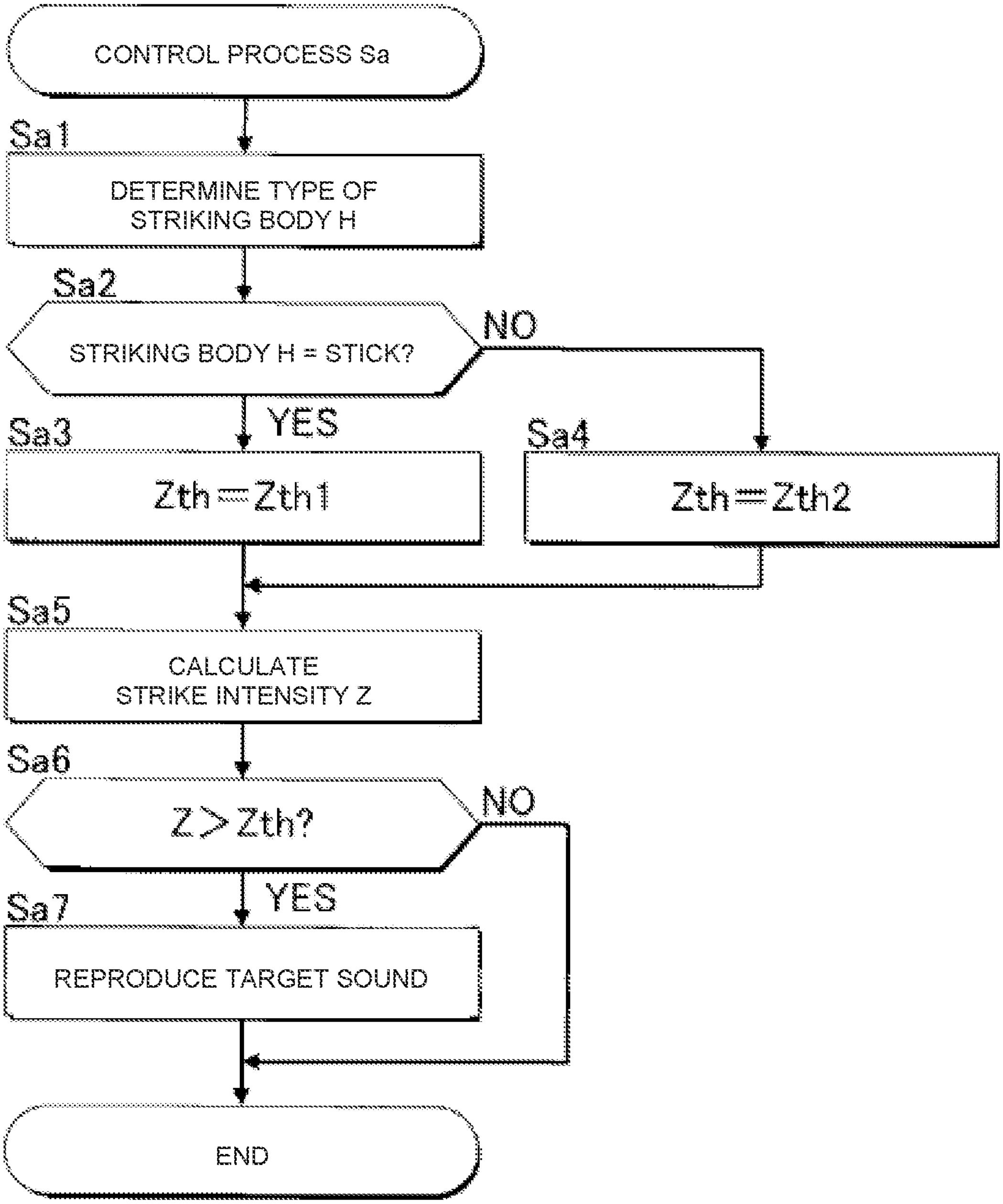
FIG. 6 is a flowchart illustrating the specific procedure of a control process.

FIG. 6 is a flowchart illustrating the specific procedure of a process (hereinafter referred to as "control process") Sa executed by the electronic controller 10. Control process Sa is repeated with a cycle that is sufficiently shorter than the cycle in which the user brings the striking body H closer to and farther away from the operation surface F.

When the control process Sa is started, the object determination module 30 analyzes image signal Q1 supplied from the image pickup device 21 to determine the type of the striking body H (Sa1). The reproduction control module 31 determines whether the striking body H is the stick Ha (Sa2). If the striking body H is the stick Ha (Sa2: YES), the reproduction control module 31 sets threshold Zth to the first threshold value Zth1 (Sa3). On the other hand, if the striking body H is the hand Hb (Sa2: NO), the reproduction control module 31 sets threshold Zth to the second threshold value Zth2, which is lower than the first threshold value Zth1 (Sa4).

After threshold Zth is set in the procedure described above, the reproduction control module 31 analyzes sound collection signal Q2 to calculate the strike intensity Z (Sa5). The reproduction control module 31 determines whether the strike intensity Z exceeds threshold Zth (Sa6). The calculation of the strike intensity Z (Sa5) is performed at any point in time from the start of the control process Sa to the comparison with threshold Zth (Sa6).

If the strike intensity Z exceeds the threshold Zth (or the strike intensity Z is equal to the threshold Zth) (Sa6: YES), the reproduction control module 31 causes the sound output device 13 to reproduce the target sound (Sa7). More specifically, the target sound is reproduced if the operation surface F is struck by the stick Ha with the strike intensity Z that exceeds the first threshold value Zth1 or if the operation surface F is struck by the hand Hb with the strike intensity Z that exceeds the second threshold value Zth2. On the other hand, if the strike intensity Z is below threshold Zth (Sa6: NO), the reproduction control module 31 does not reproduce the target sound.

As described above, in the first embodiment, the target sound reproduction conditions are different when the striking body H is determined to be the stick Ha and when the striking body H is determined to be the hand Hb. Therefore, the target sound can be reproduced in appropriate conditions which correspond to the type of the striking body H. Moreover, since the type of the striking body H is determined from an image taken of the striking body H, the target sound can be reproduced under conditions that correspond to the type of the striking body H without the user having to perform any special operations, such as selecting the type of the striking body H.

B: Second Embodiment

The second embodiment will be described below. For those elements that have functions that are similar to those of the first embodiment in each of the embodiments described below, the same reference numerals used in the descriptions of the first embodiment will be used, and their detailed descriptions will be appropriately omitted.

The reproduction control module 31 of the second embodiment controls an acoustic characteristic of the target sound. More specifically, the reproduction control module 31 controls the acoustic characteristics of the target sound in accordance with the strike intensity Z with which the striking body H strikes the operation surface F. An acoustic characteristic can be, for example, the pitch or volume of the target sound. For example, the reproduction control module 31 raises the pitch of the target sound with increasing the strike intensity Z. Also, the reproduction control module 31 increases the volume of the target sound with increasing the strike intensity Z. The fact that the target sound is reproduced when the strike intensity Z exceeds the threshold Zth (Zth1, Zth2) is the same as in the first embodiment.

The same effects that are realized in the first embodiment are realized in the second embodiment. Further, in the second embodiment, the strike intensity Z with which the striking body H strikes the operation surface F is used both for the determination pertaining to whether to reproduce the target sound (Sa6) and for controlling the acoustic characteristic of the target sound. Therefore, there is also the advantage that the process for reproducing the target sound (control process Sa) is simplified compared with a configuration in which separate pieces of information are used to determine whether or not to reproduce the sound and to control the acoustic characteristic.

In the description above, the acoustic characteristic of the target sound is controlled in accordance with the strike intensity Z, but the information used for controlling the acoustic characteristic is not limited to the strike intensity Z. For example, the reproduction control module 31 can control the acoustic characteristic of the target sound in accordance with the speed or direction of movement of the striking body H with respect to the operation surface F. The reproduction control module 31 can control the acoustic characteristic of the target sound in accordance with which part of the operation surface F is struck by the striking body H. Further, the acoustic characteristic to be controlled by the reproduction control module 31 is not limited to the pitch or volume. For example, the reproduction control module 31 can control various acoustic characteristics, such as the tone.

C: Third Embodiment

Figure 7:
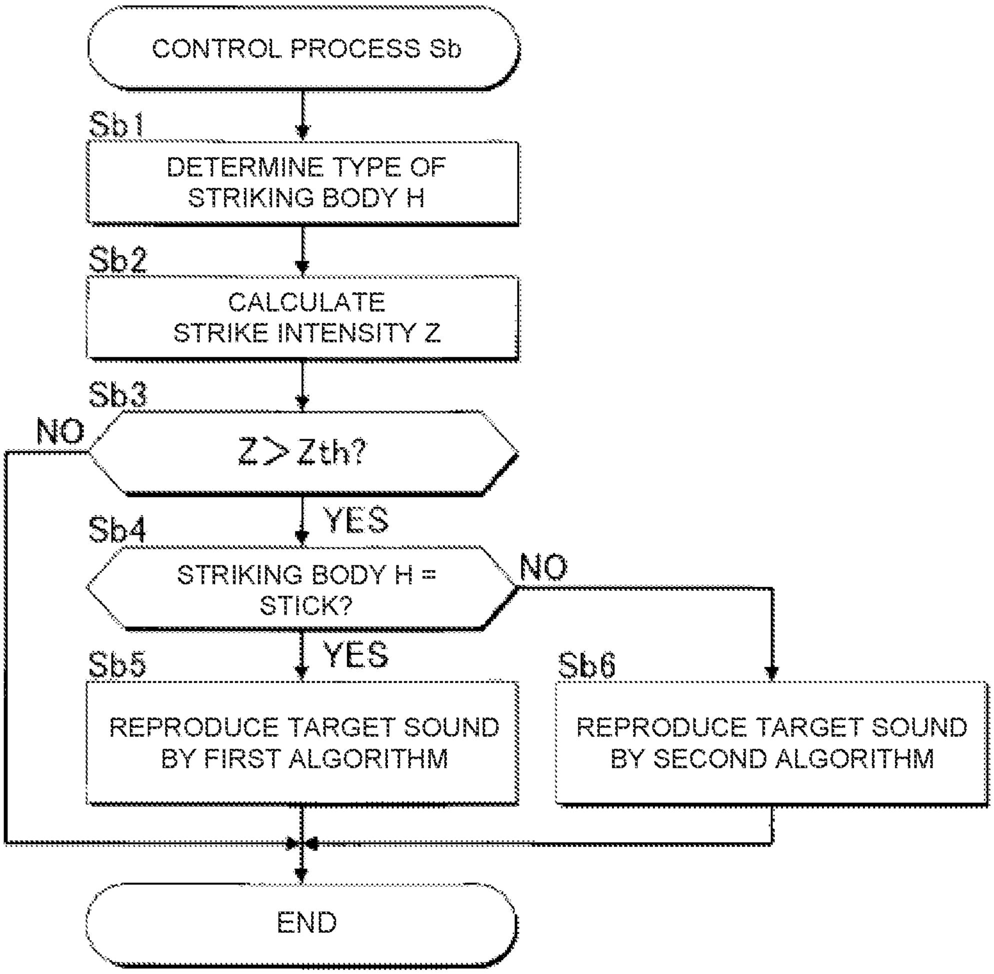
FIG. 7 is a flowchart illustrating the specific procedure of a control process in a third embodiment.

The electronic controller 10 of the third embodiment executes a control process Sb of FIG. 7, instead of the control process Sa illustrated in FIG. 6. The control process Sb is repeated with a cycle that is sufficiently shorter than the cycle in which the user brings the striking body H closer to and farther away from the operation surface F.

When the control process Sb is started, the object determination module 30 analyzes the image signal Q1 to determine the type of the striking body H in the same manner as in the first embodiment (Sb1). The reproduction control module 31 analyzes the sound collection signal Q2 to calculate the strike intensity Z (Sb2). The reproduction control module 31 determines whether the strike intensity Z exceeds the threshold Zth (Sb3). The threshold Zth in the third embodiment is set to a prescribed value that is independent of the type of the striking body H. If the strike intensity Z is below threshold Zth (Sb3: NO), the reproduction control module 31 ends the control process Sb.

On the other hand, if the strike intensity Z exceeds the threshold Zth (or if the strike intensity Z is equal to the threshold Zth) (Sb3: YES), the reproduction control module 31 determines whether the striking body H is the stick Ha (Sb4). If the striking body H is the stick Ha (Sb4: YES), the reproduction control module 31 uses a first acoustic process (first algorithm) to generate audio signal X of the target sound (Sb5). On the other hand, if the striking body H is the hand Hb (Sb4: NO), the reproduction control module 31 uses a second acoustic process (second algorithm) to generate audio signal X of the target sound (Sb6).

The first acoustic process and the second acoustic processing are each an acoustic process for synthesizing the target sound. The first acoustic process and the second acoustic process have different processing contents. For example, one of the first acoustic process and the second acoustic process is a process for generating the audio signal X by processing waveform data stored in the storage device 11. The other of the first acoustic process and the second acoustic process is a process for selecting one of a plurality of waveform data representing target sounds with different acoustic characteristics as the audio signal X.

As shown in the example above, when the striking body H is the stick Ha, the target sound is reproduced by using the first acoustic process (first condition). On the other hand, when the striking body H is the hand Hb, the target sound is reproduced by using the second acoustic process (second condition). That is, the target sound reproduction conditions (type of acoustic process) are different when the striking body H is the stick Ha and when the striking body H is the hand Hb.

The same effects that are realized in the first embodiment are realized in the third embodiment. The configuration of the second embodiment for controlling the acoustic characteristics of the target sound can be applied similarly to the third embodiment.

D: Fourth Embodiment

Figure 8:
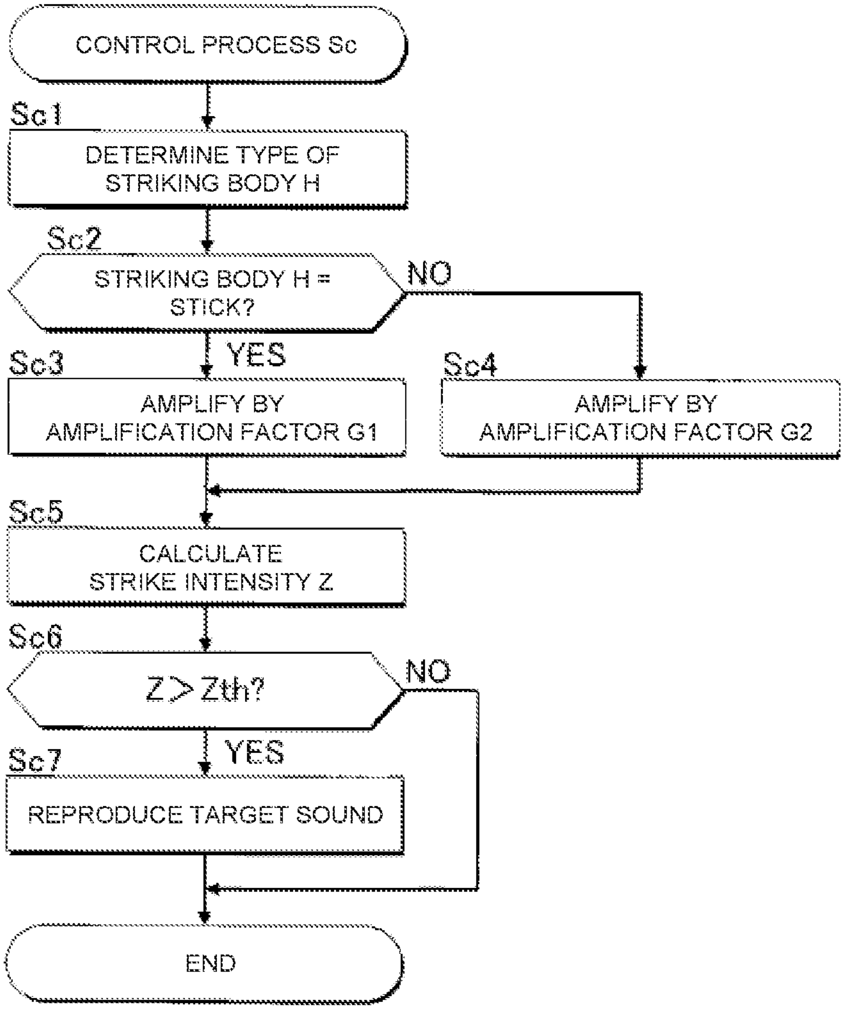
FIG. 8 is a flowchart illustrating the specific procedure of a control process in a fourth embodiment.

The electronic controller 10 of the fourth embodiment executes control process Sc of FIG. 8 instead of the control process Sa of FIG. 6. The control process Sc is repeated with a cycle that is sufficiently shorter than the cycle in which the user brings the striking body H closer to and farther away from the operation surface F.

When the control process Sc is started, the object determination module 30 analyzes the image signal Q1 to determine the type of the striking body H in the same manner as in the first embodiment (Sc1). The reproduction control module 31 determines whether the striking body H is the stick Ha (Sc2). If the striking body H is the stick Ha (Sa2: YES), the reproduction control module 31 amplifies the sound collection signal Q2 by an amplification factor (gain) G1 (Sc3). On the other hand, if the striking body H is the hand Hb (Sc2: NO), the reproduction control module 31 amplifies the sound collection signal Q2 by an amplification factor G2 (Sc4). The amplification factor G1 and amplification factor G2 are set to different values. More specifically, the amplification factor G2 is greater than the amplification factor G1 (G2>G1).

The reproduction control module 31 calculates the strike intensity Z by analyzing the amplified sound collection signal Q2 (Sc5). In particular, the reproduction control module 31 calculates the strike intensity Z (first intensity of striking) based on the sound collection signal Q2 (first signal) amplified by the amplification factor G1 when the striking body H is the stick Ha. The reproduction control module 31 calculates the strike intensity Z (second intensity of striking) based on the sound collection signal Q2 (second signal) amplified by the amplification factor G2 when the striking body H is the hand Hb. As described above, the intensity with which the striking body H strikes the operation surface F tends to be low when the striking body H is the hand Hb, compared to the case in which the striking body H is the stick Ha. Based on the aforementioned tendency, in the fourth embodiment, when the striking body H is the hand Hb, the sound collection signal Q2 is amplified by the amplification factor G2, which is greater than the amplification factor G1 which is used when the striking body H is the stick Ha. Therefore, the strike intensity Z, calculated from the amplified sound collection signal Q2, is an intensity that has been corrected in accordance with the type of the striking body H, such that the difference in intensities caused by the difference in the type of the striking body H is reduced.

The reproduction control module 31 determines whether the strike intensity Z exceeds the threshold Zth (Sc6). Threshold Zth in the fourth embodiment is set to a prescribed value that is independent of the type of the striking body H. If the strike intensity Z is below the threshold Zth (Sc6: NO), the reproduction control module 31 ends the control process Sc. On the other hand, if the strike intensity Z exceeds the threshold Zth (or if the strike intensity Z is equal to the threshold Zth) (Sc6: YES), the reproduction control module 31 causes the sound output device 13 to reproduce the target sound. The reproduction control module 31 can cause the target sound to be reproduced at a volume that corresponds to the strike intensity Z (that is, the intensity corrected in accordance with the type of the striking body H).

As shown in the example above, if the striking body H is the stick Ha, the target sound is reproduced on the condition (first condition) that the strike intensity Z, calculated from the sound collection signal Q2 after amplification by amplification factor G1, exceeds the threshold Zth. On the other hand, if the striking body H is the hand Hb, the target sound is reproduced on the condition (second condition) that the strike intensity Z, calculated from the sound collection signal Q2 after amplification by amplification factor G2, exceeds the threshold Zth. That is, the target sound reproduction conditions are different when the striking body H is the stick Ha and when the striking body H is the hand Hb.

The same effects that are realized in the first embodiment are realized in the fourth embodiment. The configuration of the second embodiment for controlling the acoustic characteristics of the target sound can be similarly applied to the fourth embodiment.

The amplification factor G1 and the amplification factor G2 are set to fixed values, for example, but the fourth embodiment is not limited to this example. For example, the amplification factor G1 and the amplification factor G2 can be variable values that vary in accordance with a prescribed factor. More specifically, the reproduction control module 31 can change the amplification factor G1 or the amplification factor G2 linearly or nonlinearly in accordance with the volume of the sound collection signal Q2. For example, the amplification factor G1 or the amplification factor G2 can be set to a smaller value when the volume of sound collection signal Q2 exceeds a threshold value, as compared with the case in which the volume is below the threshold value. Further, the amplification factor G1 and the amplification factor G2 can be changed over time. For example, the reproduction control module 31 decreases the amplification factor G1 or the amplification factor G2 over time from the time of rise of the sound collection signal Q2. Further, the amplification of the sound collection signal Q2 is not limited to linear amplification, but can also be nonlinear amplification. With both linear and nonlinear amplification, assuming a situation in which the volume of the sound collection signal Q2 is held constant, amplification is performed so that the volume of the amplified sound collection signal Q2 tends to become smaller when the striking body H is the stick Ha compared to when the striking body H is the hand Hb.

E: Fifth Embodiment

Figure 9:
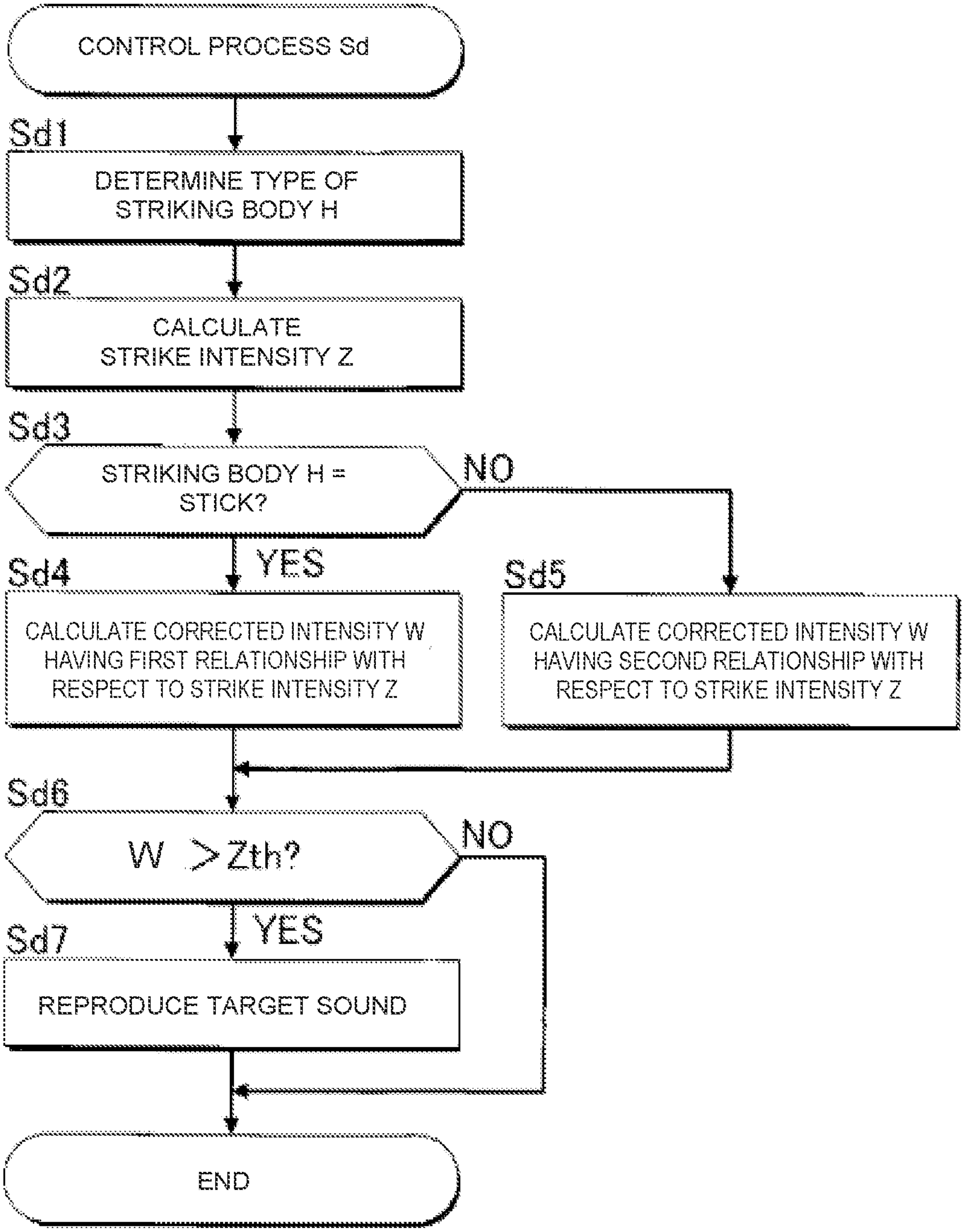
FIG. 9 is a flowchart illustrating the specific procedure of a control process in a fifth embodiment.

The electronic controller 10 of the fifth embodiment executes control process Sd of FIG. 9 instead of control process Sa of FIG. 6. The control process Sd is repeated with a cycle that is sufficiently shorter than the cycle in which the user brings the striking body H closer to and farther away from the operation surface F.

When the control process Sd is started, the object determination module 30 analyzes the image signal Q1 to determine the type of the striking body H in the same manner as in the first embodiment (Sd1). The reproduction control module 31 analyzes the sound collection signal Q2 to calculate the strike intensity Z (Sd2). The reproduction control module 31 determines whether the striking body H is the stick Ha (Sd3).

If the striking body H is the stick Ha (Sd3: YES), the reproduction control module 31 generates a numerical value (hereinafter referred to as "corrected intensity") W that corresponds to the strike intensity Z (Sd4). Specifically, the reproduction control module 31 generates the corrected intensity W which has a prescribed relationship (hereinafter referred to as "first relationship") with respect to the strike intensity Z. For example, the reproduction control module 31 multiplies the strike intensity Z by a prescribed coefficient $\alpha 1$ to calculate the corrected intensity W ($W=\alpha 1 \cdot Z$). That is, the first relationship is a proportionality relationship in which the corrected intensity W is a product of the coefficient $\alpha 1$ and the strike intensity Z.

On the other hand, if the striking body H is the hand Hb (Sd3: NO), the reproduction control module 31 generates the corrected intensity W which has a relationship (hereinafter referred to as "second relationship") with respect to the strike intensity Z, which is different from the first relationship (Sd5). For example, the reproduction control module 31 multiplies the strike intensity Z by a prescribed coefficient $\alpha 2$ to calculate the corrected intensity W ($W=\alpha 2 \cdot Z$). That is, the second relationship is a proportionality relationship in which the corrected intensity W is a product of the coefficient $\alpha 2$ and the strike intensity Z. The Coefficients $\alpha 1$ and $\alpha 2$ are set to different values. Specifically, the coefficient $\alpha 2$ is greater than the coefficient $\alpha 1$ ($\alpha 2>\alpha 1$).

As described above, the intensity with which the striking body H strikes the operation surface F tends to be low when the striking body H is the hand Hb, compared to the case in which the striking body H is the stick Ha. Based on the aforementioned tendency, in the fifth embodiment, the first relationship between the strike intensity Z and the corrected intensity W when the striking body H is the stick Ha is different from the second relationship between the strike intensity Z and the corrected intensity W when the striking body H is the hand Hb. As can be understood from the foregoing explanation, the corrected intensity W is the intensity that has been corrected in accordance with the type of the striking body H, such that the difference in intensities caused by the difference in the type of the striking body H is reduced.

The reproduction control module 31 determines whether the corrected intensity W exceeds threshold Zth (Sd6). The threshold Zth in the fifth embodiment is set to a prescribed value that is independent of the type of the striking body H. If the corrected intensity W is below the threshold Zth (Sd6: NO), the reproduction control module 31 ends control process Sd. On the other hand, if corrected intensity W exceeds the threshold Zth (or if the corrected intensity W is equal to the threshold Zth) (Sd6: YES), the reproduction control module 31 causes the sound output device 13 to reproduce the target sound (Sd7). The reproduction control module 31 can cause the target sound to be reproduced at a volume that corresponds to the corrected intensity W.

As described above, if the striking body H is the stick Ha, the target sound is reproduced on the condition (first condition) that corrected intensity W, which has the first relationship (W=al Z) with respect to the strike intensity Z, exceeds the threshold Zth. On the other hand, if the striking body H is the hand Hb, the target sound is reproduced on the condition (second condition) that corrected intensity W, which has the second relationship ($W=\alpha 2 \cdot Z$) with respect to the strike intensity Z, exceeds the threshold Zth. That is, the target sound reproduction conditions are different when the striking body H is the stick Ha and when the striking body H is the hand Hb.

The same effects that are realized in the first embodiment are realized in the fifth embodiment. The configuration of the second embodiment for controlling the acoustic characteristics of the target sound can be similarly applied to the fifth embodiment.

In the foregoing description, the corrected intensity W is calculated by multiplying the strike intensity Z by the coefficients ($\alpha$1, $\alpha$2), but the method of generating corrected intensity W is not limited to this example. For example, the reproduction control module 31 can use a table associating each value of the strike intensity Z with each value of the corrected intensity W to generate the corrected intensity W that corresponds to the strike intensity Z.

For example, a first table that corresponds to the first relationship and a second table that corresponds to the second relationship are stored in the storage device 11. Each value of the corrected intensity W that has the first relationship with respect to each value of the strike intensity Z is registered in the first table, and each value of the corrected intensity W that has the second relationship with respect to each value of the strike intensity Z is registered in the second table. The first table specifies any first relationship (for example, a relationship other than the above-mentioned proportionality relationship) that exists between the strike intensity Z and the corrected intensity W. Similarly, the second table specifies any second relationship (for example, a relationship other than the above-mentioned proportionality relationship) that exists between the strike intensity Z and the corrected intensity W. The first table and the second table, in other words, are each a function for converting the strike intensity Z into the corrected intensity W. For example, assuming a situation in which the strike intensity Z is held constant, it is sufficient to execute a conversion in which corrected intensity W tends to become smaller when the striking body H is the stick Ha, as compared to when the striking body H is the hand Hb.

If the striking body H is the stick Ha, the reproduction control module 31 specifies the corrected intensity W that corresponds to the strike intensity Z from the first table. On the other hand, if the striking body H is the hand Hb, the reproduction control module 31 specifies the corrected intensity W that corresponds to the strike intensity Z from the second table. The same effect as in the fifth embodiment is realized in the configuration described above.

F: Modification

Specific modified embodiments to be added to each of the aforementioned embodiment examples are illustrated below. Two or more embodiments arbitrarily selected from the following examples can be appropriately combined insofar as they are not mutually contradictory.

(1) In the aforementioned embodiments, the sound collection signal Q2 representing sounds including striking sounds is analyzed to detect the striking of the operation surface F by the striking body H, but the configuration and method for detecting the striking of operation surface F by the striking body H is not limited to the example described above. For example, the image signal Q1 generated by the image pickup device 21 can be analyzed to detect the striking of the operation surface F by the striking body H. For example, the reproduction control module 31 estimates the distance between the striking body H and the operation surface F by analyzing the image signal Q1 and determining that the striking body H has struck the operation surface F when this distance is zero. The sound collection device 22 can be omitted in a configuration in which a strike is detected by analyzing the image signal Q1. Further, a contact sensor (for example, an electrostatic capacitive sensor) that detects contact between the striking body H and the operation surface F (light transmission portion 20*b*), a vibration sensor that detects the vibration of the operation surface F (light transmission portion 20*b*), or a pressure sensor that detects pressure acting on the operation surface F from the striking body H can be used for the detecting the striking of operation surface F by the striking body H. A mechanical switch which is switched to one of two states (for example, the ON state and the OFF state) due to the impact of the striking body H can be used for the strike detection.

(2) In the aforementioned embodiments, a configuration in which the stick Ha of a percussion instrument strikes operation surface F is illustrated, but elements other than the hand Hb (striking member) that strike operation surface F are not limited to the stick Ha. For example, the user can strike an operation surface F with a mallet used for playing keyboard percussion instruments such as a xylophone or a marimba. The stick Ha and the mallet are collectively referred to as striking members for striking operation surface F.

(3) The configuration of the housing 20 of the detection unit 2 is arbitrary. Further, the structure in which the image pickup device 21 and the sound collection device 22 are housed in the housing 20 is not mandatory. That is, as long as the detection unit 2 includes an operation surface F with which the striking body H comes in contact, the specific structure and presence/absence of the housing 20 are not particularly limited.

(4) In the aforementioned embodiments, a configuration in which the user's hand Hb actually comes in contact with the operation surface F is illustrated, but a configuration can be employed in which the user touches a virtual operation surface F utilizing haptic technology (haptics) that uses haptic feedback, for example. In this case, the user operates a simulated hand present in a virtual space to contact the operation surface F placed within the virtual space. The user perceives that he or she is actually touching the operation surface F by using a vibrating body that vibrates when in contact with operation surface F in the virtual space. As can be understood from the foregoing explanation, the operation surface F can be a virtual surface in a virtual space. Similarly, the object that comes in contact with the operation surface F (for example, hand Hb) can be a virtual object in a virtual space.

(5) As described above, the functions of the reproduction control system 100 (particularly the function of the control system 1) illustrated above are realized by cooperation between one or a plurality of processors that constitute the electronic controller 10 and a program stored in the storage device 11. The program according to the present disclosure can be provided in a form stored in a computer-readable storage medium and installed on a computer. The storage medium is, for example, a non-transitory storage medium, a good example of which is an optical storage medium (optical disc) such as a CD-ROM, but can include storage media of any known form, such as a semiconductor storage medium or a magnetic storage medium. Non-transitory storage media include any storage medium that excludes transitory propagating signals and does not exclude volatile storage media. Further, in a configuration in which a distribution device distributes the program via a communication network, a storage device that stores the program in the distribution device corresponds to the non-transitory storage medium.

G: Additional Statement

For example, the following configurations can be understood from the foregoing embodiment examples.

A reproduction control method according to one aspect (Aspect 1) of the present disclosure is executed by a computer and comprises determining, based on an image showing an object, whether the type of the object is a first type or a second type that is different from the first type, and reproducing a sound, triggered by a striking of an operation surface by the object, based on the result of the determination.

In a specific example (Aspect 2) of Aspect 1, reproducing a sound based on the result of the determination includes reproducing the sound when a first condition is satisfied when the type of object is determined to be the first type, and reproducing the sound when a second condition that is different from the first condition is satisfied when the type of object is determined to be the second type.

In a specific example (Aspect 3) of Aspect 1, reproducing a sound based on the result of the determination includes reproducing the sound using a first acoustic processing when the type of object is determined to be the first type, and reproducing the sound using a second acoustic processing that is different from the first acoustic processing when the type of object is determined to be the second type.

By at least one of the aspects described above, since the conditions for reproducing a sound or for the acoustic processing of a sound are different when the object is determined to be the first type than when the object is determined to be the second type, it is possible to appropriately reproduce the sound in accordance with the type of object. Further, because the type of object is determined from an image showing the object, it is possible to reproduce the target sound in accordance with the type of object without requiring the user to perform any special operations for selecting the type of object.

The second type is different from the first type. For example, a specific type different from the first type, or any type other than the first type, are included in the "second type." For example, if the first type is the human hand, the second type is a striking member used with a percussion instrument (a specific type different that the first type), or an object other than a human hand (any type other than the first type). As can be understood from the foregoing explanation, the determination of the type of object includes both a process for determining whether the object corresponds to the first type or the second type, and a process for determining whether the object corresponds to the first type (or the second type).

In a specific example (Aspect 4) of Aspect 2, the first condition is that the intensity of the strike exceed a first threshold value, and the second condition is that the intensity of the strike exceed a second threshold value that is different from the first threshold value. In the aspect described above, when the object is determined to be the first type, sound is reproduced when the intensity of the strike exceeds the first threshold value (that is, when the first condition is satisfied), and when the object is determined to be the second type, sound is reproduced when the intensity of the strike exceeds the second threshold value (that is, the second condition is satisfied).

In a specific example (Aspect 5) of Aspect 4, the first type is the striking member of a percussion instrument, the second type is the user's hand, and the second threshold value is less than the first threshold value. A strike from a striking member and a strike from the user's hand are different in that the intensity of a strike from the striking member is often greater than the intensity of a strike from the human hand. By a configuration in which the second threshold value is less than the first threshold value, the difference between the probability that the first condition will be satisfied when the human hand strikes the operation surface and the probability that the second condition will be satisfied when a striking member strikes the operation surface can be reduced. Therefore, the tendency that it is less likely that sound will be reproduced when the operation surface is struck by the human hand than when the operation surface is struck by a striking member can be mitigated.

In a specific example (Aspect 6) of either Aspect 4 or 5, the intensity of a strike is the intensity of a sound collection signal generated by collecting the striking sound generated by the strike. By the configuration described above, it is possible to use the sound collection device to easily specify the intensity of a strike with which the operation surface is struck by an object.

In a specific example (Aspect 6) of Aspects 7 to 4, reproducing a sound based on the determination result includes controlling an acoustic characteristic of the sound in accordance with the intensity. By the configuration described above, the intensity of the strike on the operation surface by the object is used both for the determination pertaining to whether to reproduce the target sound and for controlling the acoustic characteristic of the target sound therefore, the process for reproducing the sound is simplified compared with a configuration in which separate pieces of information are used to determine whether or not to reproduce the sound and to control the acoustic characteristic.

In a specific example (Aspect 8) of Aspect 2, reproducing a sound based on the determination result includes amplifying a sound collection signal generated by collecting the sound of impact generated by a strike by a first amplification factor to generate a first signal and calculating a first intensity of the strike based on the first signal, or amplifying the sound collection signal by a second amplification factor that is different from the first amplification factor to generate a second signal and calculating a second intensity of the strike based on the second signal; the first condition is that the first intensity exceed the threshold value, and the second condition is that the second intensity exceed the threshold value.

In a specific example (Aspect 9) of Aspect 2, the first condition is that a first intensity in a first relationship with respect to the intensity of the strike exceed the threshold value, and the second condition is that a second intensity in a second relationship that is different than the first relationship with respect to the intensity of the strike exceed the threshold value.

The reproduction control system according to one aspect (Aspect 10) of the present disclosure comprises an object determination unit that determines, based on an image showing an object, whether the type of object is a first type or a second type that is different from the first type; and a reproduction control unit that reproduces a sound based on the result of the determination, where the reproduction is triggered by a striking of an operation surface by the object.

A program according to one aspect (Aspect 11) of the present disclosure causes a computer to execute processes for determining, based on an image showing an object, whether the type of object is a first type or a second type that is different from the first type, and reproducing a sound based on the result of the determination, where the reproduction is triggered by a striking of an operation surface by the object.

The present disclosure can be applied to a reproduction control method, a reproduction control system, or a program. The reproduction control method is executed by the electronic controller 10 as a computer.

What is claimed is:

1. A reproduction control method executed by a computer, the reproduction control method comprising:

determining, based on an image showing an object, whether a type of the object is a first type or a second type that is different from the first type; and reproducing a sound, triggered by a striking of an operation surface by the object, based on a result of the determining, wherein the reproducing of the sound based on the result of the determining includes reproducing the sound in response to a first condition being satisfied, upon determining that the type of the object is the first type, and reproducing the sound in response to a second condition different from the first condition being satisfied, upon determining that the type of the object is the second type, the first condition is a condition in which an intensity of the striking exceeds a first threshold value, and the second condition is a condition in which the intensity of the striking exceeds a second threshold value that is different from the first threshold value.

2. The reproduction control method according to claim 1, wherein the reproducing of the sound based on the result of the determining further includes reproducing the sound using a first acoustic processing, upon determining that the type of the object is the first type, and reproducing the sound using a second acoustic processing that is different from the first acoustic processing, upon determining that the type of the object is the second type.

3. The reproduction control method according to claim 1, wherein the first type is a striking member of a percussion instrument, the second type is a hand of a user, and the second threshold value is less than the first threshold value.

4. The reproduction control method according to claim 1, wherein the intensity of the striking is an intensity of a sound collection signal generated by collecting a striking sound generated by the striking.

5. The reproduction control method according to claim 1, wherein the reproducing of the sound based on the result of the determining includes controlling acoustic characteristics of the sound in accordance with the intensity of the striking.

6. The reproduction control method according to claim 4, wherein the reproducing of the sound based on the result of the determining further includes amplifying a sound collection signal, which is generated by collecting a striking sound generated by the striking, by a first amplification factor to generate a first signal, and calculating a first intensity of the striking based on the first signal, or amplifying the sound collection signal by a second amplification factor that is different from the first amplification factor to generate a second signal, and calculating a second intensity of the striking based on the second signal, the first condition is a condition in which the first intensity exceeds a third threshold value, and the second condition is a condition in which the second intensity exceeds the third threshold value.

7. The reproduction control method according to claim 4, wherein the first condition is a condition in which a first corrected intensity of the striking exceeds a fourth threshold value, the first corrected intensity is generated by using a first function that converts an intensity of the striking into the first corrected intensity, the second condition is a condition in which a second corrected intensity of the striking exceeds the fourth threshold value, the second corrected intensity is generated by using a second function that converts an intensity of the striking into the second corrected intensity, and the second function is different than the first function.

8. A reproduction control system comprising:

an electronic controller including at least one processor, the electronic controller being configured to execute a plurality of modules including an object determination module configured to determine, based on an image showing an object, whether a type of the object is a first type or a second type that is different from the first type; and a reproduction control module configured to reproduce a sound, triggered by a striking of an operation surface by the object, based on a result of determination of the object determination module, the reproduction control module being configured to reproduce the sound in response to a first condition being satisfied, upon determination that the type of the object is the first type, and reproduce the sound in response to a second condition different from the first condition being satisfied, upon determination that the type of the object is the second type, wherein the first condition is a condition in which an intensity of the striking exceeds a first threshold value, and the second condition is a condition in which the intensity of the striking exceeds a second threshold value that is different from the first threshold value.

9. The reproduction control system according to claim 8, wherein the reproduction control module is further configured to reproduce the sound using a first acoustic processing, upon determination that the type of the object is the first type, and reproduce the sound using a second acoustic processing that is different from the first acoustic processing, upon determination that the type of the object is the second type.

10. The reproduction control system according to claim 8, wherein the first type is a striking member of a percussion instrument, the second type is a hand of a user, and the second threshold value is less than the first threshold value.

11. The reproduction control system according to claim 8, wherein the intensity of the striking is an intensity of a sound collection signal generated by collecting a striking sound generated by the striking.

12. The reproduction control system according to claim 8, wherein the reproduction control module is configured to control acoustic characteristics of the sound in accordance with the intensity of the striking.

13. The reproduction control system according to claim 8, wherein the reproduction control module is further configured to amplify a sound collection signal, which is generated by collecting a striking sound generated by the striking, by a first amplification factor to generate a first signal, and calculate a first intensity of the striking based on the first signal, or amplify the sound collection signal by a second amplification factor that is different from the first amplification factor to generate a second signal, and calculate a second intensity of the striking based on the second signal, the first condition is a condition in which the first intensity exceeds a third threshold value, and the second condition is a condition in which the second intensity exceeds the third threshold value.

14. The reproduction control system according to claim 8, wherein the first condition is a condition in which a first corrected intensity of the striking exceeds a fourth threshold value, the first corrected intensity is generated by using a first function that converts an intensity of the striking into the first corrected intensity, the second condition is a condition in which a second corrected intensity of the striking exceeds the fourth threshold value, the second corrected intensity is generated by using a second function that converts an intensity of the striking into the second corrected intensity, and the second function is different than the first function.

15. A non-transitory computer readable medium storing a program that causes a computer to execute a process, the process comprising:

determining, based on an image showing an object, whether a type of the object is a first type or a second type that is different from the first type; and reproducing a sound, triggered by a striking of an operation surface by the object, based on a result of the determining, the reproducing of the sound based on the result of the determining includes reproducing the sound in response to a first condition being satisfied, upon determining that the type of the object is the first type, and reproducing the sound in response to a second condition different from the first condition being satisfied, upon determining that the type of the object is the second type, the first condition is a condition in which an intensity of the striking exceeds a first threshold value, and the second condition is a condition in which the intensity of the striking exceeds a second threshold value that is different from the first threshold value.

* * * * *